United States Patent [19]
Stephenson

[11] Patent Number: 5,958,634
[45] Date of Patent: Sep. 28, 1999

[54] DISPLAY APPARATUS USING LIGHT PATTERNABLE CONDUCTIVE TRACES

[75] Inventor: Stanley W. Stephenson, Spenceport, N.Y.

[73] Assignee: Eastman Kodak Company, Rochester, N.Y.

[21] Appl. No.: 08/961,059

[22] Filed: Oct. 30, 1997

[51] Int. Cl.⁶ .................... G03C 1/005; G02F 1/1335; G02F 1/1343
[52] U.S. Cl. .................... 430/7; 430/311; 430/319; 430/321; 430/495.1; 430/564; 349/106; 349/139
[58] Field of Search .................... 430/7, 311, 319, 430/321, 495.1, 564; 349/106, 139, 143

[56] References Cited

U.S. PATENT DOCUMENTS

| | | | |
|---|---|---|---|
| 3,033,765 | 5/1962 | King et al. | 205/118 |
| 3,464,822 | 9/1969 | Blake et al. | 430/311 |
| 5,462,822 | 10/1995 | Roosen et al. | 430/7 |
| 5,462,833 | 10/1995 | Hauquier et al. | 430/159 |

*Primary Examiner*—John A. McPherson
*Attorney, Agent, or Firm*—Raymond L. Owens

[57] ABSTRACT

In a structure for making a display that forms images including a transparent substrate having first and second surfaces; a light sensitive conductive layer provided over the first surface of the transparent substrate and patternable to form conductive traces; and an array which can produce a colored image.

17 Claims, 5 Drawing Sheets

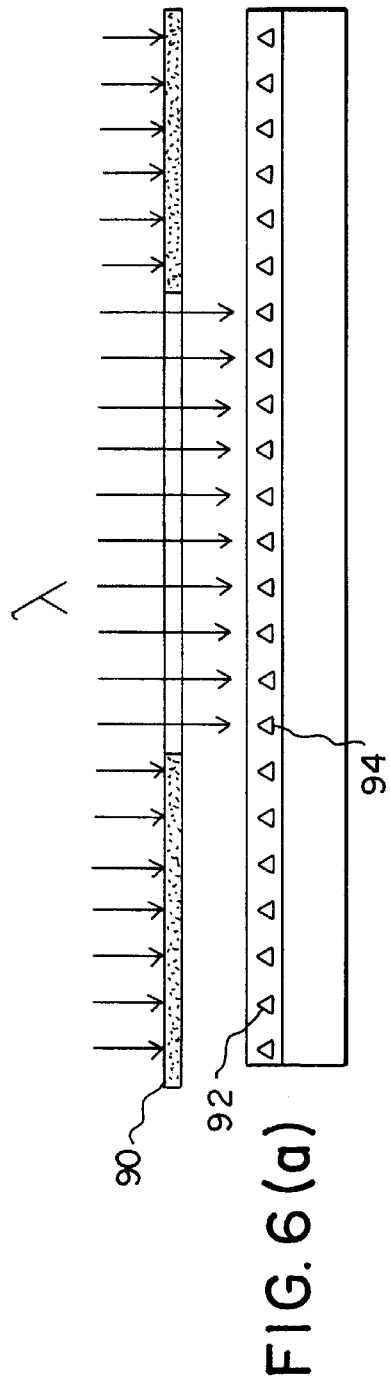
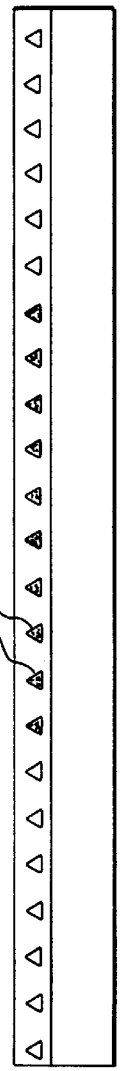
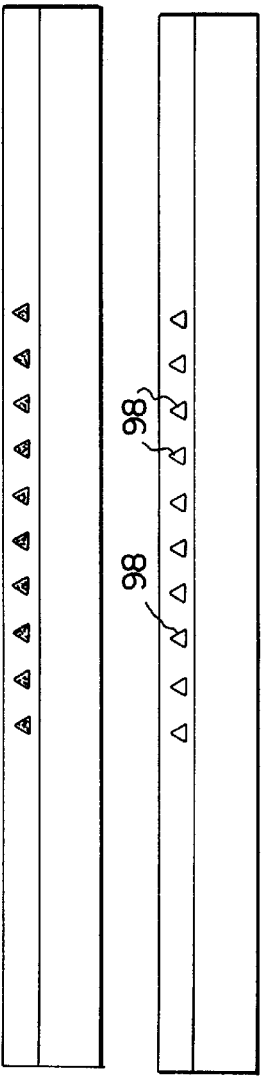
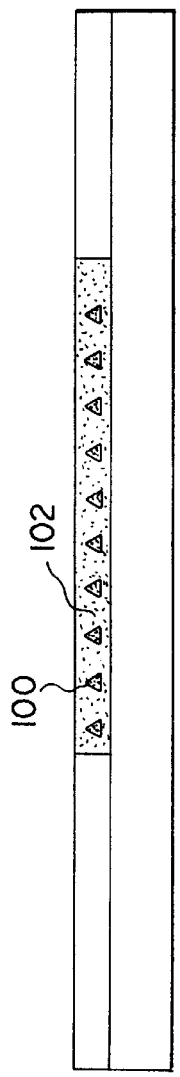
FIG.6(a) FIG.6(b) FIG.6(c) FIG.6(d) FIG.6(e)

DISPLAY APPARATUS USING LIGHT PATTERNABLE CONDUCTIVE TRACES

CROSS REFERENCE TO RELATED APPLICATIONS

The present invention is related to commonly assigned U.S. patent application Ser. No. 08/961,056 filed Oct. 30, 1997, entitled "Single Sheet Display Having Patternable Conductive Traces" to Stanley W. Stephenson. The disclosure of this related application is incorporated herein by reference.

FIELD OF THE INVENTION

The field of invention pertains to image displays. The invention is directed to flat panel displays that use electrically modulated signals to control light passing through thin multilayered plates. The invention more specifically uses two separated sets of traces formed in silver halide emulsion to provide electrical potential across a light modulating material.

BACKGROUND OF THE INVENTION

Flat panel displays can be fabricated using many techniques. Typical embodiments are disclosed in *Liquid Crystal Flat Panel Displays* by O'Mara and other similar publications. These displays use transparent glass plates as substrates, and electrical traces are sputtered in a pattern of parallel lines that form a first set of conductive traces. A transparent conductor such as Indium Tin Oxide is sputtered over the traces to disperse an electrical charge across transparent areas not blocked by the traces. A second substrate is similarly coated with a set of traces having a transparent conductive layer.

Layers are applied over the substrates and patterned to orient liquid crystals in twisted nematic (TN) or super-twisted-nematic (STN) configurations. The two substrates are spaced apart and the space between the two substrates is filled with a liquid crystal material. Pairs of conductors from either set are selected and energized to alter the optical transmission properties of the liquid crystal material.

In another embodiment, the traces do not define an orthogonal grid, or are organized to form alpha-numeric displays or graphic images. In a further embodiment, an active display on a transparent substrate is sputtered or printed and uses memory elements to continuously drive a each display element depending on information written to the memory element. In another embodiment, disclosed in SID DIGEST 90, article 12.6, the liquid crystal material can be polymerically dispersed to form a Liquid Crystal Polymer Matrix (LCPC). LCPCs are typically disposed in ultra-violet polymerized acrylic polymers. The liquid crystals are homogenized into the polymer, and the emulsion is coated onto a substrate. Ultra violet light is applied to the emulsion. The emulsion hardens, and bubbles of liquid crystal material are held in a rigid polymeric matrix.

Image displays can provide color images if a color filter array is formed over the pixels of the display. In U.S. Pat. No. 5,462,833, three color layers are formed on a transparent substrate. In this patent, a transparent electrode layer is formed over the color filter. The filter plate is aligned onto a liquid crystal layer. The plate is glass and has silver halide, color-forming layers. A transparent electrode material is sputtered at high temperature over the CFA. In practice, the presence of the transparent electrode material causes ionic migration of the dyes in the dye layers. It would be advantageous to separate the electrically conductive layer from the dye layers.

The prior art requires many multiple, separate layers on multiple plates to build up the display. The electrical traces and transparent conductive layers are typically formed through repeated vacuum deposition of materials on the substrate. These processes are expensive and require long processing times on capital intensive equipment. It would advantageous to lower the cost of flat panel displays. Additionally, current structures are not amenable to the creation of low-cost large flat panel displays. It would be advantageous to be able to form low-cost, large flat-panel displays.

SUMMARY OF THE INVENTION

It is an object of the present invention to provide a display apparatus which overcomes the problems noted above.

Another objective of the present invention is to provide conductive traces for use in conjunction with a light modulating layer.

These objects are achieved in a structure for making a display that forms images comprising:

a) a transparent substrate having first and second surfaces;

b) a light sensitive conductive layer provided over the first surface of the transparent substrate and patternable to form conductive traces; and c) means provided over the second surface defining an array which can produce a colored image.

ADVANTAGES

The disclosed structure has the advantage of producing a display using low-cost, low-temperature layers and processes. The display utilizes low-cost photographic layer technology. It employs a light modulating layer and patterned conductive traces. Large volumes of sheet material can be coated and formed into different types of displays by exposing the light sensitive material to different patterns.

BRIEF DESCRIPTION OF THE DRAWINGS

FIGS. 6a–e show various steps in processing a light sensitive layer to provide conductive traces;

FIG. 7b is a sectional view taken along the lines 8—8 of FIG. 7a.

DETAILED DESCRIPTION OF THE INVENTION

Figure 1:
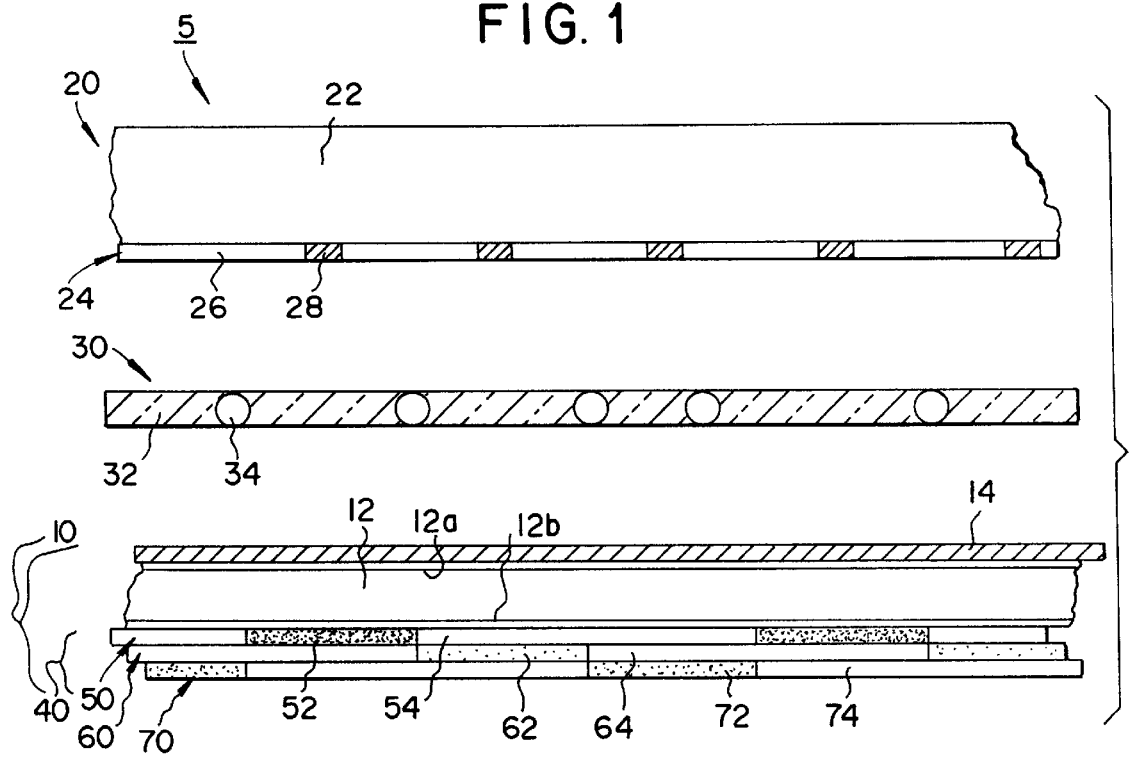
FIG. 1 is an exploded section view of elements forming a display device in accordance with the present invention.
Figure 2:
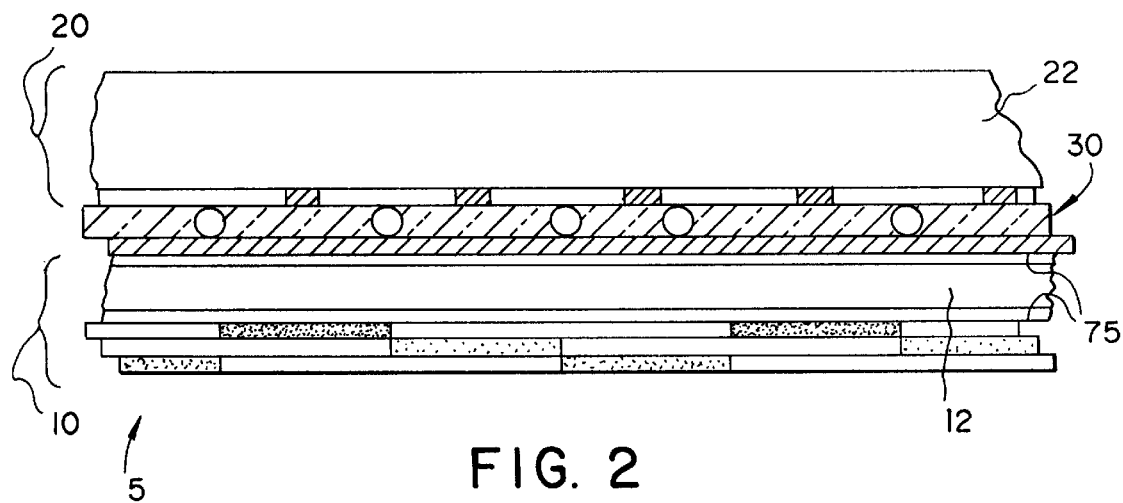
FIG. 2 is a sectional view of a completed display device.

An exploded view of the invention is shown in FIG. 1. A display 5 has a first sheet 10 with a first substrate 12 which can be a clear transparent material such as Kodak Estar film base formed of polyester plastic and has a thickness of between 20 and 200 microns. In the exemplary embodiment, the first substrate is a 80 micron thick sheet of polyester film base. Other clear polymers, such as polycarbonate can also be used. First substrate 12 has a first surface 12a that supports a light sensitive, metal forming layer 14.

In the preferred embodiment, the light sensitive, metal forming layer 14 is an emulsion of silver halide grains in gelatin. Alternatively, other light sensitive, metal forming materials can be used such as gold or copper salts. In the case of silver halide emulsions, high concentrations of silver halide salts in gelatin are used to improve conductivity over conventional imaging emulsions. Conductive additives such as fine Indium-Tin-Oxide or fine silver with diameter between 0.5 and 2.0 microns are added to emulsion to improve conductivity of photographically produced metallic silver.

The second surface of first substrate 12b supports a color filter array 40. Color filter array 40 can be a single layer printed on first substrate 12 before first light sensitive layer 14 is applied to first substrate 12. Alternatively, color filter array 40 can be three layers of silver halide, color dye forming chemistry, each layer forming a separate color of color filter array 40. An example of such a multilayered array can be found in U.S. Pat. No. 5,462,822. That invention sputters a transparent electrically conductive coating of Indium-Tin-Oxide (ITO) under high temperature over the color filter array. In this invention, the conductive layer is metallic traces disposed on the a side of first substrate 12 opposite from color filter array 40.

In the case of a multilayered, light sensitized dye-forming CFA, a red filter layer 50 is a silver halide emulsion layer that has been exposed and developed to create red filter dyed areas 52 and red filter undyed areas 54. A second green filter layer 60 is a silver halide emulsion layer that has been exposed and developed to form green filter dye areas 62 and green filter undyed areas 64. A blue filter layer 70 is a silver halide emulsion that has been exposed and developed to form blue filter dyed areas 72 and blue filter undyed areas 74. The exposure and development of a multilayered color filter array can be done before application of first light sensitive conductive layer 14. The exposure mask that forms traces in first light sensitive layer 14 is aligned to color filter array 40 to align horizontal traces 16 to color filter array 40.

In a different embodiment, both color filter array 40 and first light sensitive layer 14 are coated simultaneously. An additional layer of light absorbing material 75 is coated on one or both sides 12a and 12b of first substrate 12. Light absorbing material 75 can be formulations well known in the art that provide anti-halation layers on silver halide films. Light absorbing material 75 permit independent exposure of the layers on the two surfaces of first substrate 12. Light absorbing material 75 is soluble in the solutions used to develop the light sensitive layers so that substrate 12 is optically transmitting after the sheet has been processed.

A second sheet, 20 has a second clear substrate 22 formed of a clear polymer with properties similar to first substrate 12. A second light sensitive layer 24 is applied on a surface of second substrate 22. Light sensitive layer 24 is similar in nature to first light sensitive layer 14. Light sensitive layer 24 is exposed through a mask to form non-conducting areas 26 and conducting areas 28.

First sheet 10 and second sheet 20 are oriented so that conductive traces 14 and 28 are aligned. A light modulating material layer 30 is disposed between the first sheet 10 and second sheet 20 and the two sheets are pressed against light modulating material layer 30. Light modulating material layer 30 can be a liquid crystal 32 of conventional design and contain spacer beads 34 that provide a calibrated distance between first sheet 10 and second sheet 20. In another embodiment, a liquid crystal material is homogenized in a polymeric binder such as gelatin. The gelatin emulsion is applied to one of the two sheets and the other sheet is pressed against the polymer dispersed liquid crystal (PDLC). Upon drying, the gelatin acts as a binder to hold the two sheets together. Other light-modulating, electrically operated materials can also be applied between the two sheets such as a ferroelectric (FLC) material.

Figure 3:
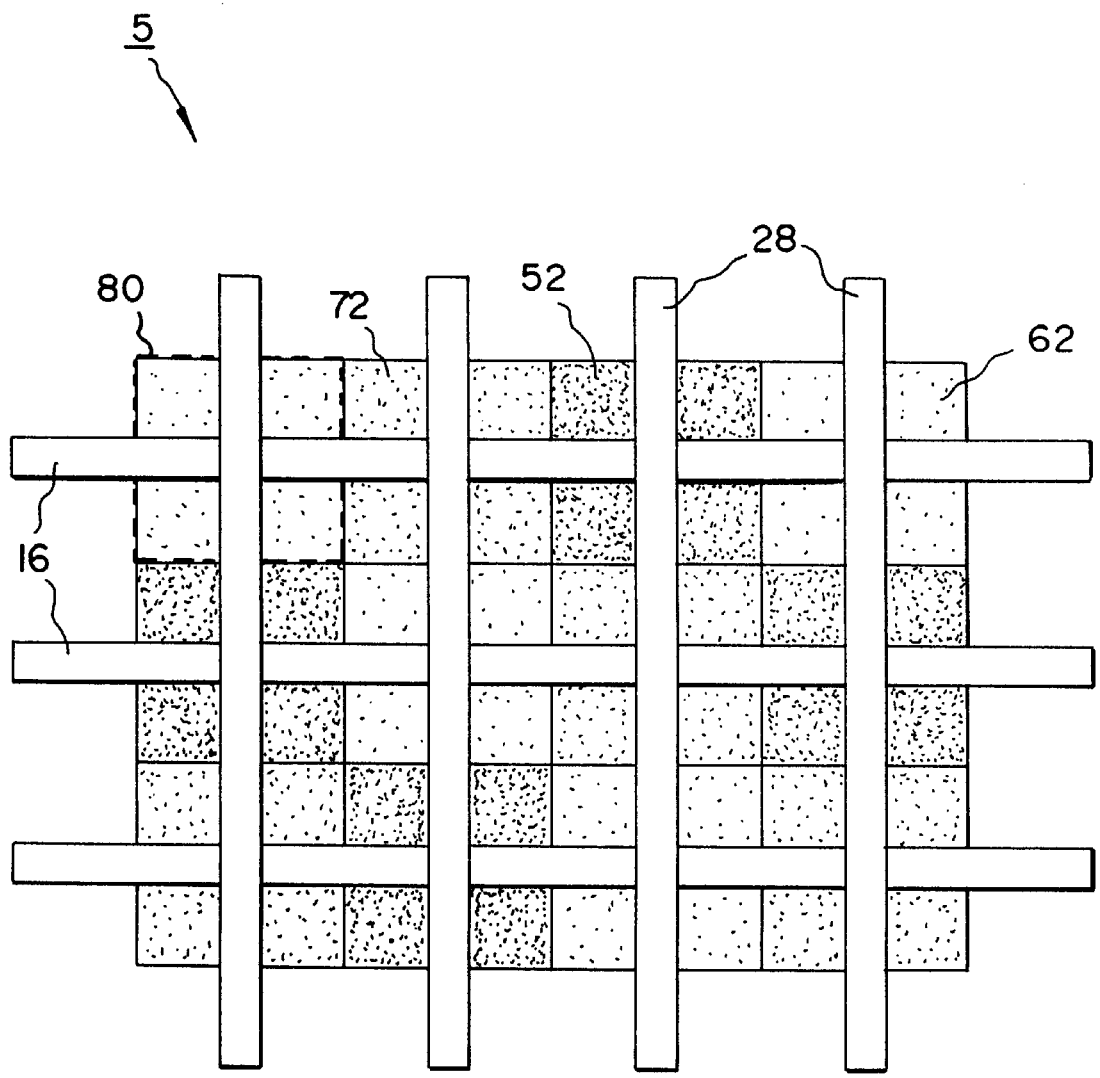
FIG. 3 is a top view of the display device of FIG. 2.

A completed display 5, is shown in FIG. 3. For sake of clarity, it is assumed that the light modulating material has been driven to a transparent state. Vertical traces 28 in second sheet 20 are on the top layer. Light modulating material layer 30 is transparent in the drawing. Horizontal traces 16 are formed in first light sensitive layer 14. Red filter dye area 52, green filter dye area 62 and blue filter dye area 72 are formed into pixels 80 to create color filter array 40.

In this preferred embodiment, display 5 is designed to display images according to video standard SMPTE 274M. Horizontal traces consist of 1080 traces that are 100 microns wide with 400 micron gaps between lines. There are 1920 vertical traces 28 which are 100 microns wide with 400 micron gaps between lines. Clear aperture is 400 microns square in a 500 square micron pixel.

Figure 4:
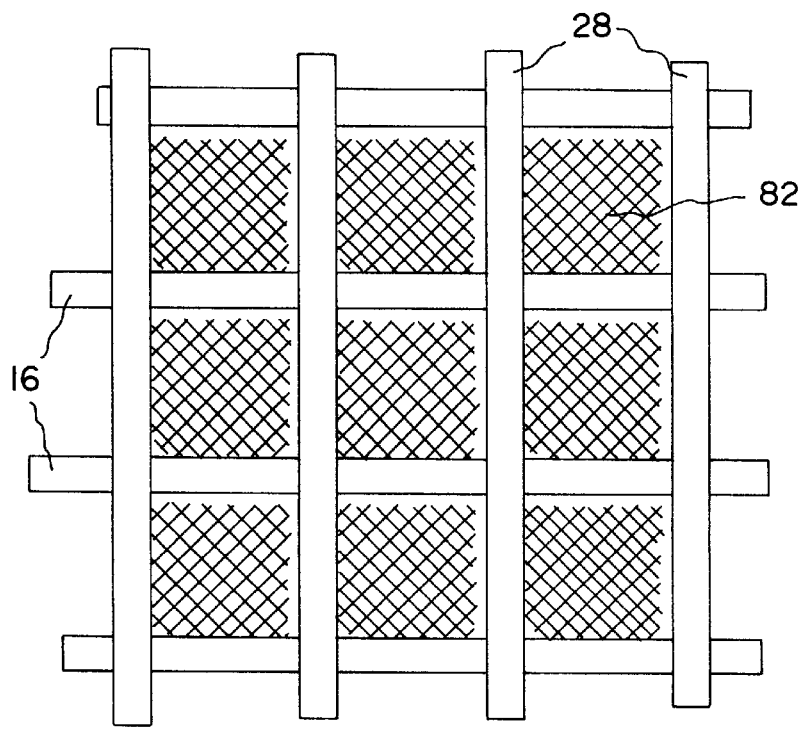
FIG. 4 is a detail of filaments provided across an aperture of the display device of FIG. 3.
Figure 5:
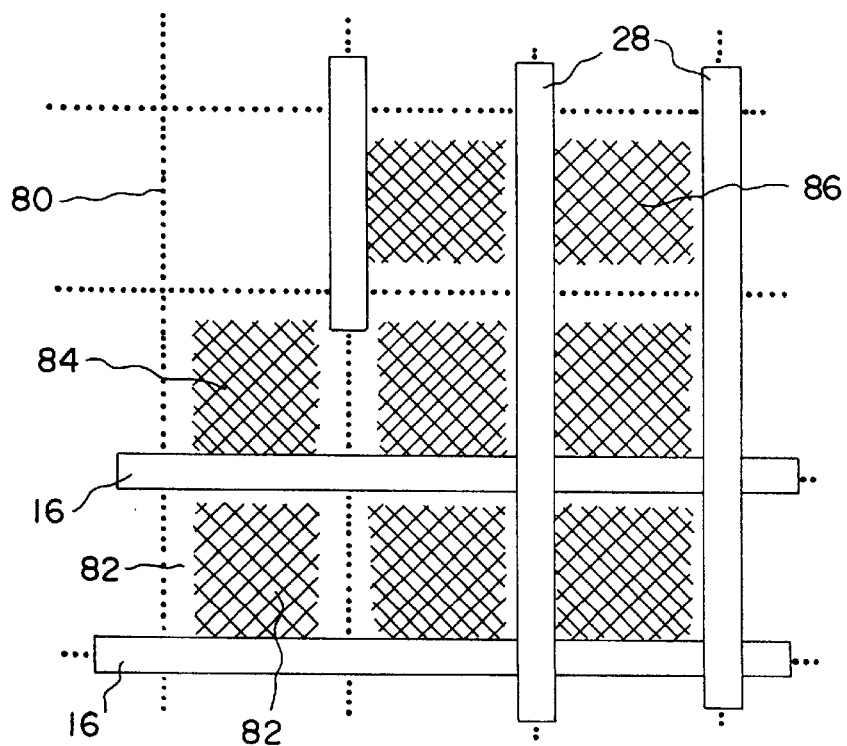
FIG. 5 is a broken sectional view of FIG. 4.

FIG. 4 and FIG. 5 detail a conductive structure that is formed within each pixel 80. Horizontal traces 16 and vertical traces 28 are opaque and frame each pixel in this embodiment. A clear aperture 82 acts as the light modulating area for each pixel. Horizontal traces 16 have a vertical filament grid 84 across clear aperture 82. Vertical filament grid 84 can be composed of two sets of filaments 5 microns wide and pitched 15 microns apart that are orthogonal to each other and pitched a 45 degree angle. Horizontal filament grid 86 are similar in structure to vertical filament grid 84 and run horizontally from each vertical trace 28. The intersection of two sets of filaments across a clear aperture spread electrical charge from traces 16 and 28 across clear aperture 82. Stated differently, the vertical and horizontal first and second conductive traces are aligned so that when a potential is applied between them, a field is produced which operates upon the light modulating material layer 30 to selectively transmit light which passes through the second transparent substrate 22, the light modulating layer 30, the second transparent substrate 12, and the color filter array 40 so that a displayed image is produced.

In an alternative embodiment, the pixel is defined as the four quadrants around the intersection of the traces as shown in FIG. 3. Filament grids 84 and 86 are disposed into each of the four quadrants. This alternative structure has the advantage that an electrical field is stretched less than half way across clear aperture 82. This reduces field loss across grids 84 and 86 by reducing the distance that the filament grids 84 and 86 spread charge.

The areas between filament grids 84 and 86 can be exposed to a level of radiation that causes limited metallic silver to be deposited in the clear areas between the filaments. Alternatively, non-photosensitive, electrically conductive particles such as fine indium-tin oxide between 0.5 and 2.0 microns in diameter can be incorporated in layers 14 and 24 to spread the electrical field across openings between the filaments. In another embodiment, indium-tin oxide is sputter coated on substrates 12 and 22 before light sensitive layers are applied to either surface. In the pre-sputtered embodiment, the ITO material acts to spread charge on the filaments across opening between filaments. Some light striking each pixel is blocked by the opacity of the traces 16 and 28 and filament grids 84 and 86, and the remainder is controlled by the electrically field between processed first light sensitive layer 14 and processed second light sensitive layer 24.

FIG. 6 is a schematic representation of how conductive traces are formed in light sensitive layers 14 and 24 in accordance with a modification to U.S. Pat. No. 3,033,765 and U.S. Pat. No. 3,464,822. In FIG. 6a, photo-mask 90 selectively blocks a source of light that strikes and activates exposed silver halide 94 while unexposed silver halide 92 remains inactivated. In the preferred embodiment, unexposed silver halide 92 is the light sensitive material. In FIG. 6b, display 5 has been photographically developed to convert exposed silver halide 94 to metallic silver 96. In FIG. 6c, a conventional photographic fixing step has removed unexposed silver halide 92. In FIG. 6d, the metallic silver 96 has been rehaliginated by a bleach to form re-halogenated silver 98. In FIG. 6e, rehalogenated silver 98 has been redeveloped to form redeveloped silver 100. Metallic salts in the developer deposits additional metal 102 to improve conductivity. In an alternative process, the silver metal particles in gelatin are subjected to a first plating bath to deposit palladium metal onto the silver grains. A final plating bath of copper salts adds additional conductor to improve the conductivity of the traces.

Figure 7A:
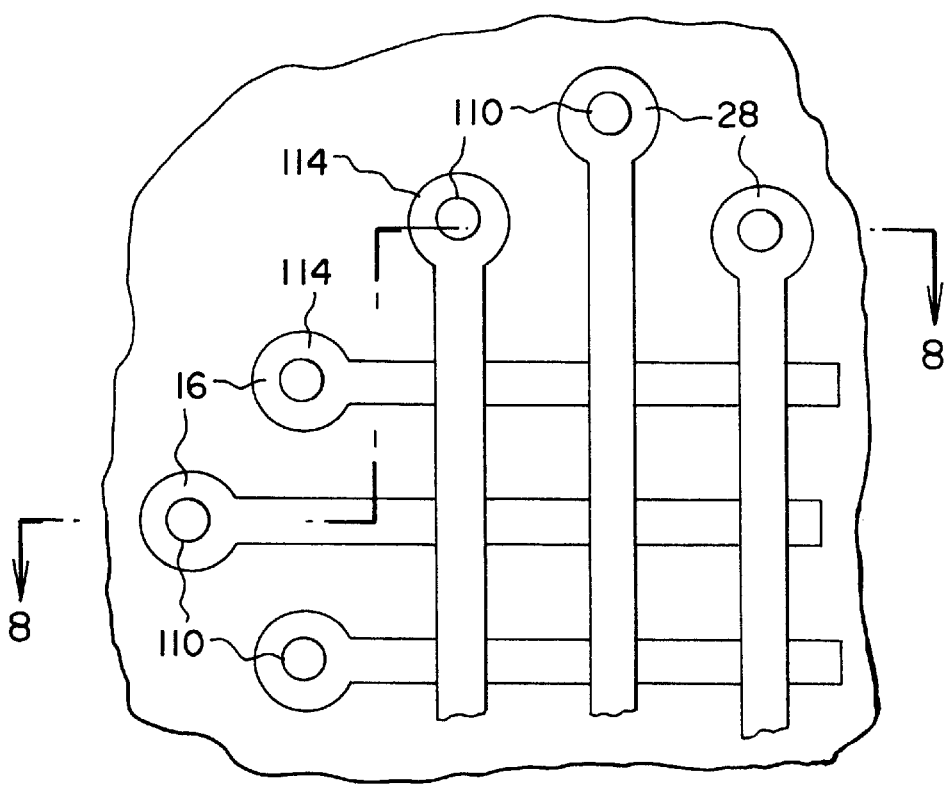
FIG. 7a is a top view showing the termination of the conductive traces.
Figure 7B:
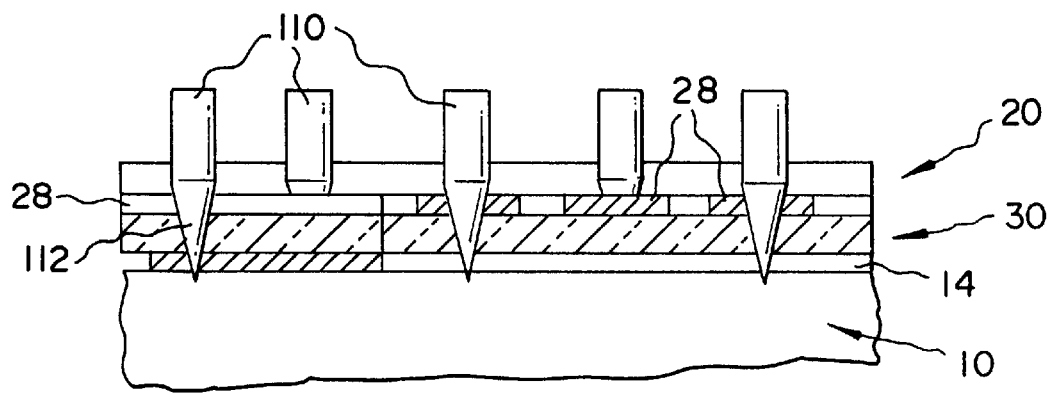

Electrical connection to display 5 is shown in FIGS. 7a and 7b. Horizontal traces 16 and vertical traces 28 terminate in a staggered pattern of conductive pads 114. Pins 110 having a piercing point 112 and are disposed in a rigid non-conductive substrate. The pins are pressed into display 5 so that piercing point 112 is driven through the pads 114 at the end of each trace. The piercing action provides electrical interconnect for traces 16 and 18 of display 5. Alternatively, areas of sheets 10 and 20 outside of the intersection of traces 16 and 28 do not overlap each other. The non overlapping areas are connected to drive electronics using conventional interconnect techniques, such as conductive bumps or wire bonding between traces 16 and 28 and drive electronics.

The invention has been described in detail with particular reference to certain preferred embodiments thereof, but it will be understood that variations and modifications can be effected within the spirit and scope of the invention.

| | |
|---|---|
| 5 | display |
| 10 | first sheet |
| 12 | first substrate |
| 12a | first substrate first surface |
| 12b | first substrate second surface |
| 14 | first light sensitive, metal forming layer |
| 16 | horizontal traces |
| 20 | second sheet |
| 22 | second substrate |
| 24 | second light sensitive layer |
| 26 | second sheet non-conducting areas |
| 28 | second sheet conducting areas (vertical traces) |
| 30 | light modulating layer |
| 32 | liquid crystal |
| 34 | spacer beads |
| 40 | color filter array |
| 50 | red filter layer |
| 52 | red filter dye area |
| 54 | red filter undyed area, |
| 60 | green filter, layer |
| 62 | green filter dye area |
| 64 | green filter undyed area |
| 70 | blue filter layer |
| 72 | blue filter dyed area |
| 74 | blue filter undyed area |
| 75 | light absorbing material |
| 80 | pixel |
| 82 | clear aperture |
| 84 | vertical filament grid |
| 86 | horizontal filament grid |
| 90 | photo-mask |
| 92 | unexposed silver halide |
| 94 | exposed silver halide |
| 96 | developed metallic silver |
| 98 | re-halogenated silver |
| 100 | redeveloped silver |
| 102 | additional metal |
| 110 | pins |
| 112 | piercing point |
| 114 | pads |

What is claimed is:

1. A structure for making a display that forms images comprising:
    a) a transparent substrate having first and second surfaces;
    b) a light sensitive conductive layer provided over the first surface of the transparent substrate and patternable to form conductive traces; and
    c) means provided over the second surface defining an array which can produce a colored image.

2. The structure of claim 1 wherein the light sensitive conductive layer includes a silver forming silver halide emulsion.

3. The structure of claim 1 wherein the color forming array each includes a silver forming silver halide emulsion.

4. Apparatus forming a display comprising:
    a) a transparent first substrate having first and second surfaces;
    b) first patterned conductive traces formed by light patterning and provided over the first surface of the transparent substrate;
    c) a color forming array provided over the second surface;
    d) a second transparent substrate having top and bottom surfaces and second conductive traces formed over its top surface;
    e) a layer including a light modulating material being provided between the bottom surface of the second transparent substrate and the second surface of the first transparent substrate; and
    f) the first and second conductive traces being aligned so that when a potential is applied between them, a field is produced which operates upon the light modulating material layer to selectively transmit light which passes through the second transparent substrate, the light modulating layer, the second transparent substrate, and the color filter array so that a displayed image is produced.

5. The apparatus of claim 4 wherein the light modulating material is a suspension of optically controlling, electrically activated material.

6. The apparatus of claim 5 wherein the light modulating material includes liquid crystals dispersed in a gelatin matrix.

7. The apparatus of claim 4 wherein the traces include conductive particles suspended in a polymeric binder.

8. The apparatus of claim 4 wherein said conductive traces are formed from a silver halide emulsion.

9. The apparatus of claim 4 wherein the light modulating material includes liquid crystals in gelatin.

10. A method of making a display apparatus comprising the steps of:
    a) providing a transparent first substrate having first and second surfaces;
    b) layer a patternable conductive layer on the First surface and patterning such layer to provide conductive traces formed over the first surface of the transparent substrate;

c) forming a color filter array over the second surface;

d) providing a second transparent substrate having top and bottom surfaces;

e) providing second conductive traces aligned with the first conductive traces formed over the top surface of the second transparent substrate;

f) layer a layer including a light modulating material between the bottom surface of the second transparent substrate and the second surface of the first transparent substrate; and g) applying potential between the aligned first and second conductive traces so that a field is produced which operates upon the light modulating material layer to selectively transmit light which passes through the second transparent substrate, the light modulating layer, the second transparent substrate, and the color filter array so that a displayed image is produced.

11. The method of claim 10 wherein the second conductive traces are formed by layer and patterning steps.

12. The method of claim 10 wherein the light modulating material is a suspension of optically controlling, electrically activated material.

13. The method of claim 10 wherein the light modulating material includes liquid crystals dispersed in a gelatin matrix.

14. The method of claim 10 wherein the traces include conductive particles suspended in a polymeric binder.

15. The method of claim 10 wherein said conductive traces are formed from a silver halide emulsion.

16. The method of claim 10 wherein the light modulating material includes liquid crystals in gelatin.

17. Apparatus forming a display comprising:

a) a first sheet including a transparent first substrate having first and second surfaces and first patterned conductive traces formed by light patterning and provided over the first surface of the transparent substrate;

b) a color forming array provided over the second surface;

c) a second sheet including a transparent second substrate having top and bottom surfaces and second conductive traces formed over its top surface; and a layer including a light modulating material being provided between the bottom surface of the second transparent substrate and the second surface of the first transparent substrate; and d) the first and second conductive traces being aligned so that when a potential is applied between them, a field is produced which operates upon the light modulating material layer to selectively transmit light which passes through the second transparent substrate, the light modulating layer, the second transparent substrate, and the color filter array so that a displayed image is produced.

* * * * *